US006547313B2

(12) United States Patent
Syron

(10) Patent No.: US 6,547,313 B2
(45) Date of Patent: Apr. 15, 2003

(54) METHOD AND ARTICLE FOR MASKING A MOTOR VEHICLE

(76) Inventor: John Syron, 8308 Office Park Dr., Suite 3-B, Grand Blanc, MI (US) 48439

( * ) Notice: Subject to any disclaimer, the term of this patent is extended or adjusted under 35 U.S.C. 154(b) by 81 days.

(21) Appl. No.: 09/775,127

(22) Filed: Feb. 1, 2001

(65) Prior Publication Data

US 2001/0045760 A1 Nov. 29, 2001

Related U.S. Application Data

(60) Provisional application No. 60/179,796, filed on Feb. 2, 2000.

(51) Int. Cl.[7] .............................................. B60J 11/00

(52) U.S. Cl. ........................ 296/136; 150/166; 118/505

(58) Field of Search ............................... 296/136, 95.1; 150/166, 168; 118/505, 301

(56) References Cited

U.S. PATENT DOCUMENTS

| | | | | |
|---|---|---|---|---|
| 1,472,651 A | | 10/1923 | Holling | |
| 2,227,453 A | | 1/1941 | Koch | 91/65 |
| 2,646,097 A | | 7/1953 | Gaverth et al. | 150/52 |
| 2,801,667 A | * | 8/1957 | Curran | |
| 3,032,433 A | | 5/1962 | Lewis et al. | 117/38 |
| 3,130,078 A | * | 4/1964 | Lewis et al. | |
| 3,850,141 A | | 11/1974 | Schmitt | 118/505 |
| 3,884,523 A | | 5/1975 | Allen | 296/136 |
| 4,315,535 A | | 2/1982 | Battle | 150/11 |
| 4,715,646 A | * | 12/1987 | Goffi et al. | 296/136 |
| 4,795,207 A | * | 1/1989 | Clarke | 296/136 |
| 4,938,522 A | * | 7/1990 | Herron et al. | 296/136 |
| 5,012,760 A | | 5/1991 | George, Jr. | 118/505 |
| 5,176,421 A | | 1/1993 | Fasiska | 296/136 |
| 5,193,877 A | | 3/1993 | George, Jr. | 296/136 |
| 5,306,347 A | | 4/1994 | Semle et al. | 118/504 |
| 5,845,958 A | * | 12/1998 | Rudys et al. | 296/136 |
| 5,997,071 A | * | 12/1999 | Mazzarelli | 296/136 |
| 6,059,105 A | | 5/2000 | Allain et al. | 206/335 |
| 6,099,067 A | * | 8/2000 | Butterworth | 296/136 |

* cited by examiner

*Primary Examiner*—Joseph D. Pape

(57) ABSTRACT

A motor vehicle or other large object of manufacture can be selectably masked for painting, sanding or other finishing processes by disposing the article within a large polymeric bag having a drawstring closure. The bag is closed about at least a portion of the vehicle, and an opening is formed in the bag by selectably tearing away a portion of the bag to provide access to a section of the article to be treated. Portions of the opening thus formed can be taped to the vehicle. When the process is completed, the bag can be torn away from the vehicle. In some instances, the bag includes selectably weakened portions, such as perforated portions, which facilitate tearing of the bag. Also disclosed are specific bag structures.

12 Claims, 2 Drawing Sheets

METHOD AND ARTICLE FOR MASKING A MOTOR VEHICLE

RELATED APPLICATION

This patent application claims priority of U.S. Provisional Patent Application Serial No. 60/179,796 filed Feb. 2, 2000.

FIELD OF THE INVENTION

This invention relates generally to the masking of large articles of manufacture such as motor vehicles, appliances, furniture and the like. More specifically, the invention relates to a method and article for masking motor vehicles and the like for painting, cleaning or finishing. More specifically, the invention relates to a particular configuration of masking bag and to methods for its use.

BACKGROUND OF THE INVENTION

It is often necessary to selectively mask a portion of a motor vehicle, or an appliance or other large item as a step in its painting or finishing. At times, masking is required if a selected portion of the item needs to be repainted, sanded, etched, cleaned or otherwise processed independently of the remainder. Such processing is necessary to repair damage, or for a specialized finishing such as the application of multi-colored paint finishes, pin striping and the like.

Heretofore, masking of vehicles was often carried out by taping sheets of masking material such as paper or polymeric material onto the vehicles so as to cover specific areas. The application and removal of such masking sheets is difficult and time consuming, and hence adds to manufacturing costs.

In accordance with the present invention, it has been found that a motor vehicle, or other large article of manufacture can be effectively masked by placing it within a large, polymeric bag having a draw string closure. As will be explained in detail herein below, the bag is drawn about all, or substantially all, of the vehicle, and selectively cut or torn open to allow access to the portion of the vehicle which is to be worked on. The remainder of the bag protects the vehicle from paint over spray, chemicals, mechanical damage or the like.

Use of bags or other flexible coverings for the protection of motor vehicles is known in the art, as is shown, for example, in U.S. Pat. Nos. 4,315,535; 1,472,651; 6,059,105; 5,306,347; 5,176,421 and 2,646,097. The prior art has also implemented a number of specific, preformed structures for selectively masking motor vehicles and building structures for painting. These preformed masking structures are specifically configured for particular applications, and are expensive and relatively difficult to use. Such masking structures are shown in U.S. Pat. Nos. 5,193,877; 5,012,760; 3,032,433 and 2,227,453. However, none of the foregoing shows use of any type of bag enclosure for selectively masking motor vehicles or the like.

As will be explained in detail herein below, the present invention provides a method and article which enables the rapid, low cost and selectable masking of motor vehicles. Methods and apparatus of the present invention are readily adaptable to large scale, automated manufacturing processes. These and other advantages of the present invention will be apparent from the drawings, discussion and description which follow.

BRIEF DESCRIPTION OF THE INVENTION

There is disclosed herein a masking bag and method for masking a motor vehicle. The masking bag is made from a polymeric material and has at least one opening at an end. The opening is associated with a drawstring, which may be used to at least partially close the opening. The drawstring is fabricated from polymeric materials, natural fibers, synthetic fibers, elastomeric materials, metals and combinations thereof. The polymeric material comprising the bag is preferably between one and ten mils thick, and may be fabricated from polypropylene. The masking bag is of sufficient size to at least partially enclose the motor vehicle to be masked. The masking bag may further have weakened tear regions for tearing away portions of the bag, or for tearing the bag away from the vehicle entirely.

The method for masking a motor vehicle consists of the steps of providing a masking bag, placing the vehicle into the bag and at least partially closing the opening by tensioning the string. The method may further include the step of cutting an aperture into the bag to selectively expose a portion of the vehicle. In addition, the method may also include the step of taping the perimeter of the aperture to the vehicle inside the bag, so as to protect the covered portion of the vehicle.

DETAILED DESCRIPTION OF A PREFERRED EMBODIMENT OF THE INVENTION

Figure 1:
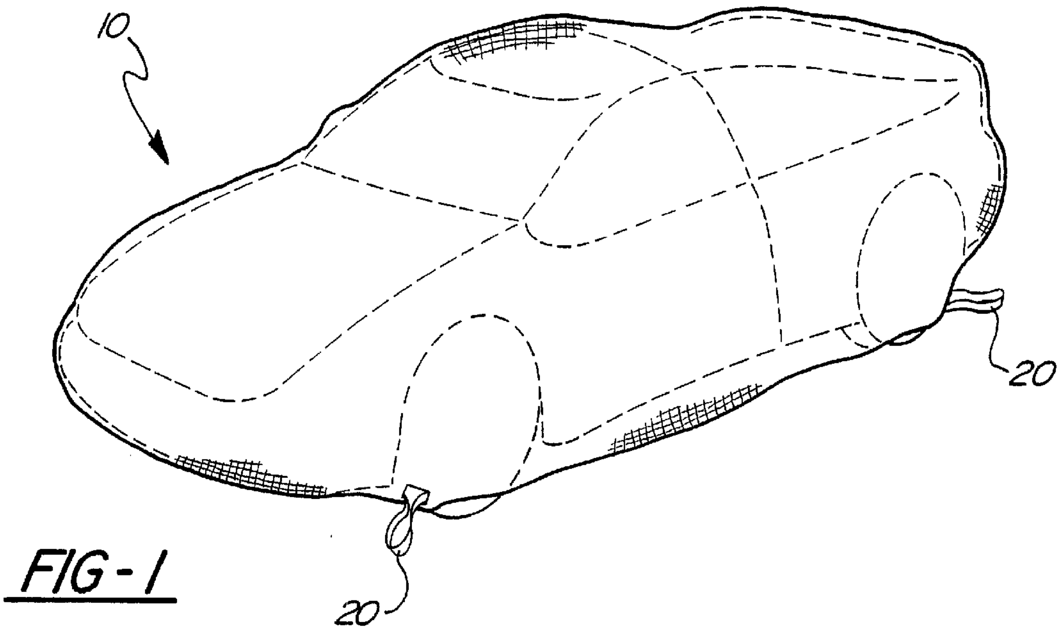
FIG. 1 is a perspective view of a vehicle shown in phantom lines, covered by a masking bag such as is contemplated by the present invention.
Figure 3:
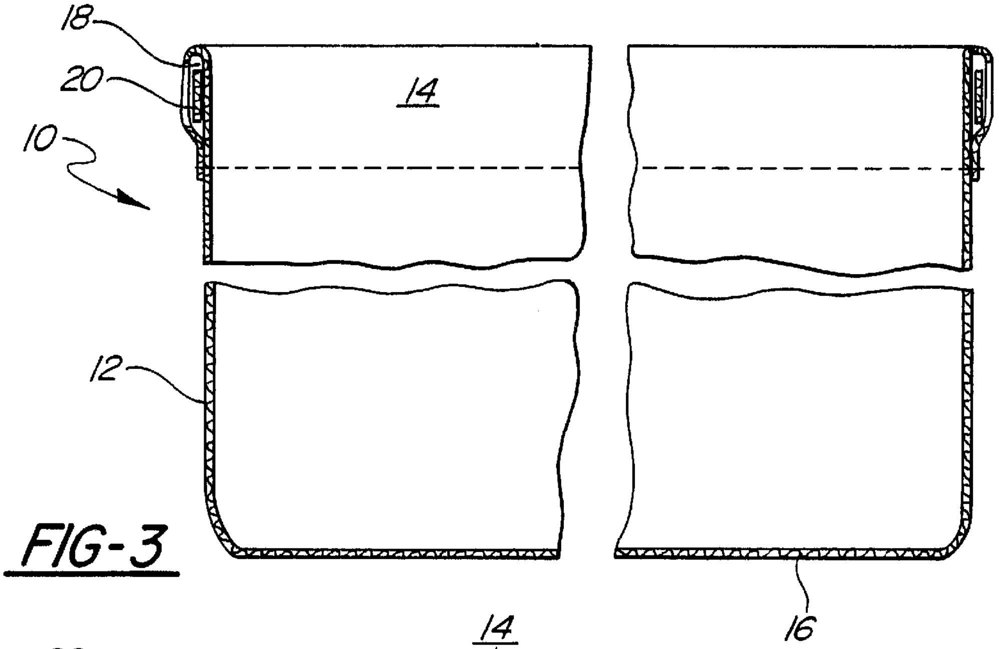
FIG. 3 is a sectional view of the masking bag.
Figure 4:
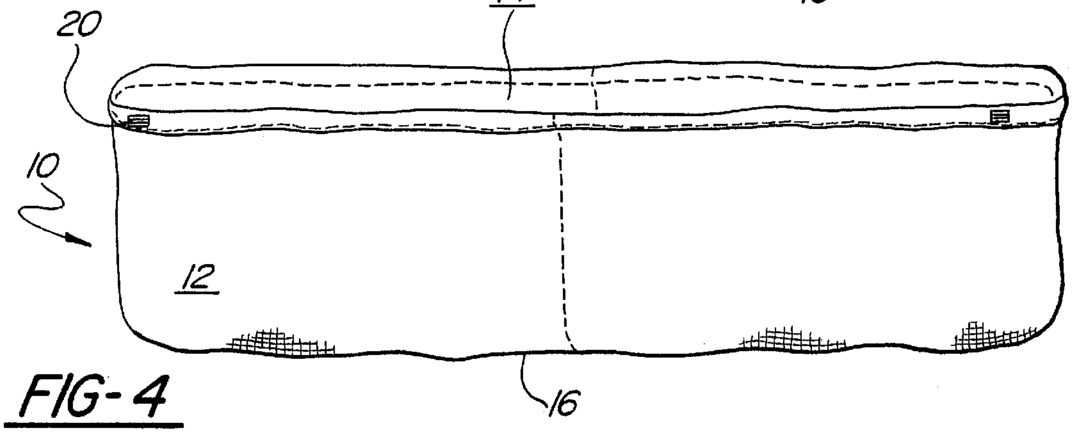
FIG. 4 is a perspective view of the masking bag.

The present invention is directed to a masking bag for masking a motor vehicle, and a method for masking which utilizes the masking bag. Referring specifically to FIG. 1, there is shown a masking bag 10 fabricated from a polymeric material. This embodiment of the masking bag as is best shown in FIGS. 3 and 4, includes a continuous sidewall 12, having an open end 14 and a closed end 16, configured to enclose an interior volume. The open end 14 of the sidewall is constructed to define a channel 18 which houses a drawstring 20. The masking bag is illustrated in its typical use on a vehicle, which is shown in phantom lines. The masking bag must be large enough to at least partially enclose the item to be masked. In the preferred embodiment, the masking bag measures 240 inches deep and 168 inches wide. In an alternative embodiment, the masking bag measures 196 inches deep by 156 inches wide. Other embodiments measure 240 inches deep by 84 inches wide, 196 inches deep by 78 inches wide, 264 inches deep by 78 inches wide, 242 inches deep by 78 inches wide, and 242 inches deep by 96 inches wide, although other sizes are contemplated. The motor vehicle is enclosed in the large polymeric bag and the open end 14 is drawn shut by the drawstring 20. Within the context of this disclosure, the drawstring 20 is defined as any type of flexible, elongated member which functions to draw shut the opening of the bag. Use of the drawstring 20 eliminates taping the bag shut, thus the present invention minimizes the labor associated with masking and reduces the amount of tape employed in the process, which tape can be a source of contamination.

Figure 2:
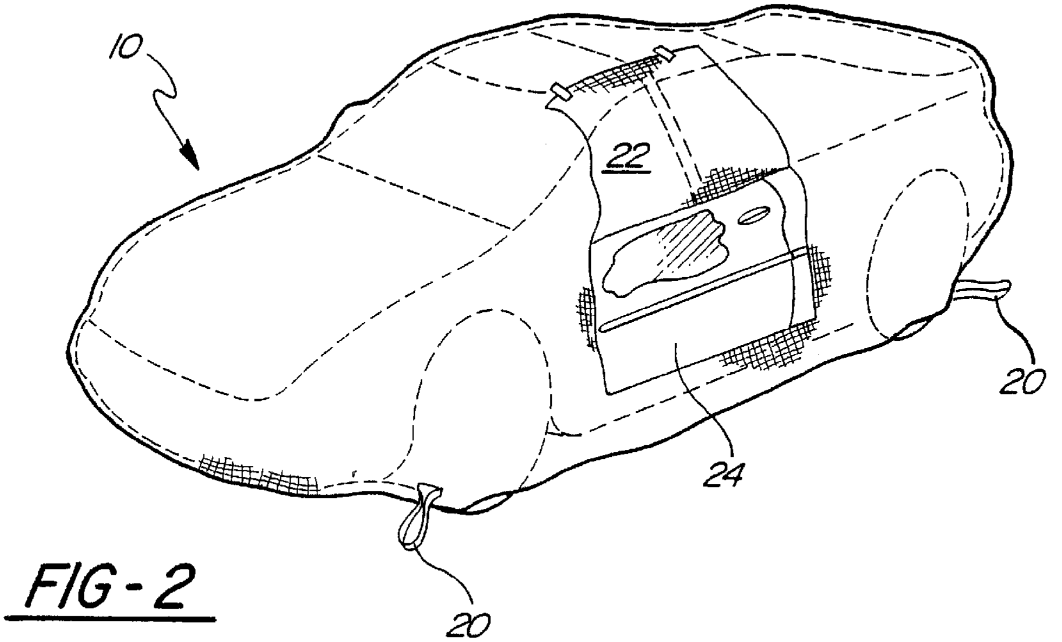
FIG. 2 is a perspective view of a vehicle shown in phantom lines, covered by a masking bag such as is contemplated by the present invention, in which a portion of the masking bag has been cut away to expose the underlying vehicle for painting.

In FIG. 2, a portion 22 of the masking bag 10 has been cut away, creating an aperture in the bag which selectively exposes a portion of the vehicle 24 therein for painting etc., while leaving the remainder of the masking bag 10 intact. Once a portion has been cut away, the edges of the masking bag comprising the perimeter of the aperture may be taped to the vehicle 24 to allow the area within the aperture to be processed, such as by sanding, painting, polishing or otherwise, while protecting the other areas of the vehicle. Once processing is complete, the bag 10 may be removed by unfastening the drawstring 20, or by simply cutting or tearing the bag away, since there is no tape holding the bag shut.

A sectional view of the bag 10 is depicted in FIG. 3 which further illustrates a cross-sectional view of the continuous channel 18 as it would house a drawstring 20. In the preferred embodiment, the channel 20 is created by lapping the edge forming the open end of the masking bag and adhering that edge to the sidewall 12 of the masking bag 10 at a given point, creating a channel 18 therein. The adherence is preferably accomplished by tack welding the edge forming the open end 18 of the masking bag to the sidewall 12 at the given point, although other methods of adhering the open end 14 to the sidewall 12 are contemplated such as sonic welding, or adhesives. The channel 20 is continuous since it encircles the open end 14 of the bag 10 and houses a drawstring 20 therethrough, with the ends of the drawstring extruding outward from the bag through at least one slit in the outward surface of the bag 10 as shown in FIG. 4. In some embodiments, the channel 18 may be discontinuous; that is to say it may be configured as one or more belt loops.

Figure 5:
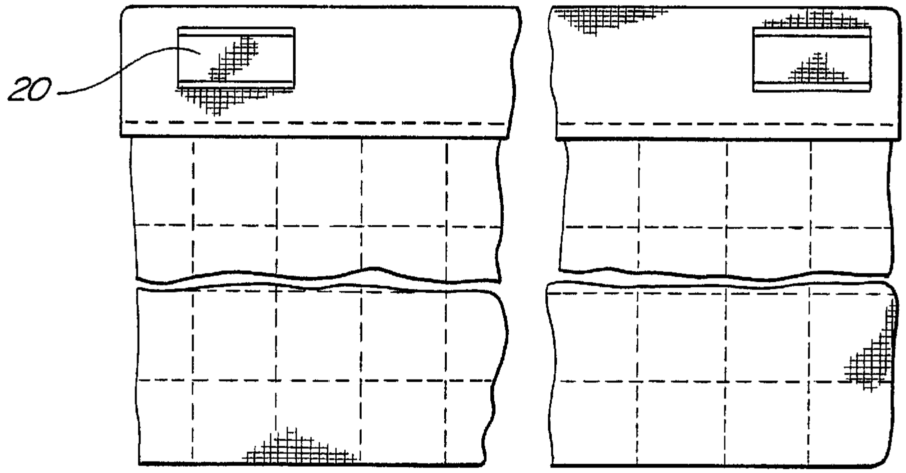
FIG. 5 is a front view of the masking bag displaying an arrangement of weakened regions.

FIG. 4 is a perspective view of the masking bag 10 and further illustrates the drawstring channel and the slits therein for the extruding drawstring 20. In addition, FIG. 5 illustrates an arrangement of weakened tear regions which can be used for either tearing away selected portions of the bag to expose the vehicle and/or for removal of the bag. The weakened tear regions may be constructed by perforating the bag at intervals, by thinning portions of the bag or by any other method which weakens a specified area of the bag. Preferably, the bag is perforated along or near to its seam to facilitate removal of the bag following masking.

With respect to materials of construction, the masking bag is preferably manufactured from a high temperature resistant polymeric material, and in the context of this disclosure, such polymers typically comprise materials having melting points of at least 100° C. High temperature polypropylene is well known in the art and is well suited for this purpose. The thickness of the polymeric material used will vary based upon the degree of ruggedness required by the application, for example, from one to ten mils, although other ranges are contemplated if required by the application. In general, it has been found that a thickness of approximately 2.0 mils is sufficient for most purposes.

The drawstring can be fabricated from polymeric materials, natural fibers, synthetic fibers, metals, including elastomeric materials and the like. Preferably, the drawstring material is also heat resistant. In the preferred embodiment of the invention, the drawstring is fabricated from a polymeric material with a thickness of 8 mils.

In some instances, the bag will include two drawstring closable openings, and as such will be configured as a cylindrical member. The presence of two openings will further enhance the ease with which the bag may be placed over the vehicle. It is to be understood that while the present invention has been described with reference to the masking of a motor vehicle, the principles thereof may be extended to the masking of furniture, appliances, and other large articles.

In various embodiments, the masking bags are supplied as a continuous web containing a number of the masking bags. The individual masking bags in the web may be delimited by perforations or the like to facilitate separation of the masking bags. Further, a notch may be formed on one or both ends of each perforation between masking bags to further simplify separation of the same.

It is further contemplated that the continuous web of masking bags may be rolled into a cylindrical form, with or without a tube-like aperture therethrough for ease of handling, shipping, storing, and the like. The cylindrical roll may have a tube-like aperture therethrough to permit mounting of the masking bags on a dowel rod or the like for dispensing, unrolling and separation of the masking bags.

While the present invention has been described with regard to the painting of motor vehicles; other applications will be apparent to one of skill in the art. For example, the bag may be used in connection with finishing or treatment of other large items such as house hold appliances, a furniture and the like. In some instances, the bag may be used to protect relatively large, sensitive equipment such as computers, electronic fabrication devices, telecommunications equipment and the like from ambient dust and pollution, such as might be encountered in field uses, or at construction sites. In such instances, the sensitive equipment can be disposed within the bag, and selected portions of the bag cut or ton away to permit access to keyboards, controls and the like. Likewise, the large volume bags of the present invention can be used to provide a containment vessel for treating large volume objects with controlled atmospheres such as inert atmospheres, fumigants, sterilizing agents and the like. The bags may also be used to protect motor vehicles, palletized goods or other large items during shipping or storage. The ease of application and removal of the bag will facilitate such uses. In view of the disclosure presented herein, yet other embodiments of the invention will be apparent to one of skill in the art.

In view of the foregoing, it is to be understood that numerous modifications and variations of the present invention may be implemented. The foregoing discussion and description is illustrative of specific embodiments of the invention, but is not meant to be a limitation upon the practice thereof. It is the following claims, including all equivalents, which define the scope of the invention.

I claim:

1. A method for masking a motor vehicle, said method including the steps of:

providing a bag which is fabricated from a polymeric material and which includes an opening at one end, said opening being closable by a drawstring;

covering said vehicle with said bag, by passing said vehicle through said opening, whereby at least a part of said vehicle is disposed within said bag;

at least partially closing the opening by tensioning the drawstring; and cutting through a portion of said bag after said vehicle is disposed therein, to create an aperture having a perimeter defined by an edge, so as to selectively expose a portion of said vehicle through said aperture.

2. The method of claim 1, wherein substantially all of said vehicle is disposed within said bag.

3. The method of claim 1 including a further step of taping at least a portion of the edge defining the perimeter of the aperture to the vehicle disposed therein, so as to allow the exposed portion of the vehicle to be processed, while protecting the covered portion of the vehicle.

4. The method of claim 1, wherein said bag is fabricated from polypropylene.

5. The method of claim 1, wherein said drawstring is fabricated from a material selected from the group consisting of: polymers, elastic, natural fibers, synthetic fibers, wire, and combinations thereof.

6. The method of claim 1, wherein said bag has at least one perforated portion operable to provide a tear region for facilitating removal of the bag.

7. A method for masking a motor vehicle, said method including the steps of:

providing a bag which is fabricated from a polymeric material and which includes an opening at one end, said opening being closable by a drawstring, said bag having at least one perforated portion operable to provide a tear region for facilitating removal of the bag;

covering said vehicle with said bag, by passing said vehicle through said opening, whereby at least a part of said vehicle is disposed within said bag; and at least partially closing the opening by tensioning the drawstring.

8. The method of claim 7, wherein substantially all of said vehicle is disposed within said bag.

9. The method of claim 7, including the further step of cutting through a portion of said bag after said vehicle is disposed therein, to create an aperture having a perimeter defined by an edge, so as to selectively expose a portion of said vehicle through said aperture.

10. The method of claim 9 including a further step of taping at least a portion of the edge defining the perimeter of the aperture to the vehicle disposed therein, so as to allow the exposed portion of the vehicle to be processed, while protecting the covered portion of the vehicle.

11. The method of claim 7, wherein said bag is fabricated from polypropylene.

12. The method of claim 7, wherein said drawstring is fabricated from a material selected from the group consisting of: polymers, elastic, natural fibers, synthetic fibers, wire, and combinations thereof.

* * * * *